United States Patent
Fu et al.

(10) Patent No.: US 10,188,975 B2
(45) Date of Patent: Jan. 29, 2019

(54) HONEYCOMB AIR FILTER AND METHODS THEREOF

(71) Applicant: Corning Incorporated, Corning, NY (US)

(72) Inventors: Xiaodong Robert Fu, Painted Post, NY (US); Wenhuan Hu, Shanghai (CN); Weizheng Yu, Shanghai (CN)

(73) Assignee: Corning Incorporated, Corning, NY (US)

( * ) Notice: Subject to any disclaimer, the term of this patent is extended or adjusted under 35 U.S.C. 154(b) by 147 days.

(21) Appl. No.: 14/876,104

(22) Filed: Oct. 6, 2015

(65) Prior Publication Data
US 2016/0107114 A1    Apr. 21, 2016

(30) Foreign Application Priority Data
Oct. 15, 2014   (CN) .......................... 2014 1 0545438

(51) Int. Cl.
*B01D 53/02*   (2006.01)
*B01D 46/24*   (2006.01)
(Continued)

(52) U.S. Cl.
CPC ..... *B01D 46/2455* (2013.01); *B01D 46/2429* (2013.01); *B01D 53/0407* (2013.01);
(Continued)

(58) Field of Classification Search
CPC ........ B01D 2253/102; B01D 2253/104; B01D 2253/106; B01D 2253/108; B01D 2253/25; B01D 2253/3425; B01D 2255/1021; B01D 2255/1023; B01D 2255/1025; B01D 2255/104; B01D 2255/106;
(Continued)

(56) References Cited

U.S. PATENT DOCUMENTS 6,397,586 B1 *  6/2002  Sakurai .............. B01D 53/9495
                                                                60/285
6,464,760 B1   10/2002  Sham et al.
(Continued)

FOREIGN PATENT DOCUMENTS

CN      1208670      2/1999
CN     101392935     3/2009
(Continued)

OTHER PUBLICATIONS

Bolashikov, et. al., "Methods for air cleaning and protection of building occupants from airborne pathogens," Building and Environment, v 44, (2009), p. 1378.
(Continued)

*Primary Examiner* — Christopher P Jones
(74) *Attorney, Agent, or Firm* — Shantanu Pathak

(57) ABSTRACT

An air filter, including:
at least one wall-flow honeycomb particulate filter having at least one coat on at least a portion of the interior surface of the filter, wherein the at least one coat comprises at least one of: a sorbent; a catalyst; or a combination thereof, and the air filter, in-use, retains from filtered air at least one of: a particulate, a volatile organic compound, or a combination thereof.
Also disclosed is an interior air purification system including the air filter, and methods of making and using the air filter.

11 Claims, 5 Drawing Sheets

(51) Int. Cl.
*B01D 53/04* (2006.01)
*B01J 35/04* (2006.01)
*B01J 27/13* (2006.01)
*B01J 21/06* (2006.01)
*B01D 53/86* (2006.01)

(52) U.S. Cl.
CPC ........ *B01D 53/8668* (2013.01); *B01J 21/063* (2013.01); *B01J 27/13* (2013.01); *B01J 35/04* (2013.01); *B01D 2046/2433* (2013.01); *B01D 2253/102* (2013.01); *B01D 2253/104* (2013.01); *B01D 2253/106* (2013.01); *B01D 2253/108* (2013.01); *B01D 2253/25* (2013.01); *B01D 2253/3425* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/2047* (2013.01); *B01D 2255/2065* (2013.01); *B01D 2255/2073* (2013.01); *B01D 2255/2092* (2013.01); *B01D 2255/2094* (2013.01); *B01D 2255/20707* (2013.01); *B01D 2255/20715* (2013.01); *B01D 2255/20723* (2013.01); *B01D 2255/20738* (2013.01); *B01D 2255/20746* (2013.01); *B01D 2255/20761* (2013.01); *B01D 2255/9155* (2013.01); *B01D 2257/708* (2013.01); *B01D 2258/06* (2013.01); *B01D 2259/4508* (2013.01)

(58) Field of Classification Search
CPC .... B01D 2255/2047; B01D 2255/2065; B01D 2255/20707; B01D 2255/20715; B01D 2255/20723; B01D 2255/2073; B01D 2255/20738; B01D 2255/20746; B01D 2255/20761; B01D 2255/2092; B01D 2255/2094; B01D 2255/9155; B01D 2257/708; B01D 2258/06; B01D 2259/4508; B01D 46/2429; B01D 46/2455; B01D 53/0407; B01D 53/8668
See application file for complete search history.

(56) References Cited

U.S. PATENT DOCUMENTS

| | | |
|---|---|---|
| 6,579,352 B1 | 6/2003 | Tanaka et al. |
| 8,172,925 B2 | 5/2012 | Bae et al. |
| 8,496,735 B2 | 7/2013 | Jones et al. |
| 8,673,207 B1 | 3/2014 | Boger |
| 2002/0018742 A1* | 2/2002 | Hoke ..................... B01D 53/02 423/219 |
| 2004/0050037 A1* | 3/2004 | Betta ................... B01D 53/9431 60/286 |
| 2010/0296966 A1* | 11/2010 | Bae ........................... A61L 2/16 422/4 |
| 2012/0134891 A1* | 5/2012 | Boger ................ B01D 46/2425 422/211 |
| 2015/0360213 A1* | 12/2015 | Bergeal ..................... B01J 35/04 60/301 |
| 2015/0367270 A1 | 12/2015 | Mazumder et al. |
| 2016/0175815 A1* | 6/2016 | Brody ................ B01J 20/28045 95/96 |

FOREIGN PATENT DOCUMENTS

| | | |
|---|---|---|
| CN | 101380574 | 11/2011 |
| CN | 202675482 U | 1/2013 |

OTHER PUBLICATIONS

Mahdy et al., Antimicrobial Activity of zero-valent Iron Nanoparticles, Int. J. of Modern Eng. Res. (IJMER), vol. 2, Issue 1, Jan.-Feb. 2012, pp. 578-581.
International Search Report, issued in connection with corresponding PCT application No. PCT/US2015/35071, dated Sep. 2, 2015.

\* cited by examiner

HONEYCOMB AIR FILTER AND METHODS THEREOF

This application claims the benefit of priority under 35 U.S.C. § 119 of Chinese Patent Application Serial No. 201410545438.8 filed on Oct. 15, 2014, the content of which is relied upon and incorporated herein by reference in its entirety.

CROSS-REFERENCE TO RELATED CO-PENDING APPLICATIONS

The present application is related to commonly owned and assigned U.S. Ser. No. 62/014,474, filed Jun. 19, 2014, entitled "Air Filter Having Anti-Microbial Property," but does not claim priority thereto.

The entire disclosure of any publication or patent document mentioned herein is incorporated by reference.

BACKGROUND

The disclosure relates to a honeycomb air filter article and methods of making and using the honeycomb air filter article in an air purification system.

SUMMARY

In embodiments, the disclosure provides a honeycomb air filter article and methods of making and using the honeycomb air filter article in an interior air purification system.

BRIEF DESCRIPTION OF DRAWINGS

In embodiments of the disclosure.

DETAILED DESCRIPTION

Figure 1:
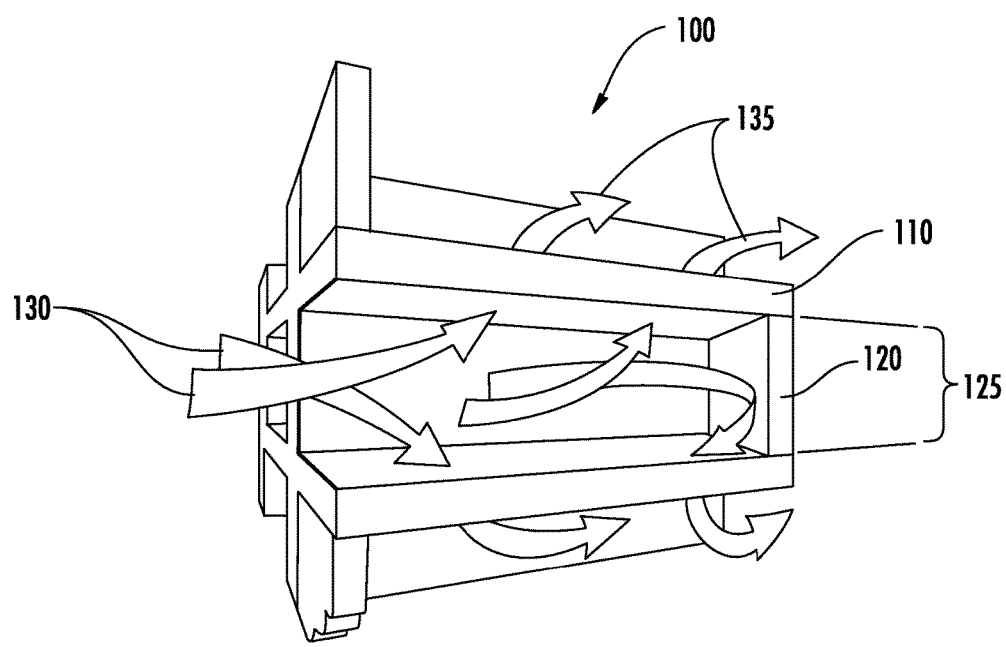
FIG. 1 shows in a cut-away perspective of a through-wall honeycomb structure filter (HSF) [PRIOR ART] illustrating air flow and the principle of operation in through-wall particulate filtration.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

"Include," "includes," or like terms mean encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The article and methods of the disclosure can include any value or any combination of the values, specific values, more specific values, and preferred values described herein, including explicit or implicit intermediate values and ranges.

The poor air quality in many rapidly industrializing countries is a significant contributor to health problems. The typical air pollutants in homes and work places can include, for example, particulate matter (PM), formaldehyde, and like volatile organic compounds (VOCs). Sources of particulate pollution can be man-made or natural. Some particulates occur naturally, originating from, for example, volcanoes, dust storms, forest and grassland fires, living vegetation, and sea spray. Human activities, such as the burning of fossil fuels in vehicles, power plants, and various industrial processes also generate significant amounts of PM. PM2.5 is the designation for respirable suspended particles having a diameter of 2.5 microns or less. PM2.5 tends to penetrate into the gas exchange regions of the mammalian lung, and very small particles (e.g., less than 100 nanometers) may pass through the lungs to affect other organs. The large number of deaths and other health problems associated with particulate pollution was first demonstrated in the early 1970s and has been reproduced many times since. PM pollution is estimated to cause 22,000 to 52,000 deaths per year in the United States (from 2000) and 200,000 deaths per year in Europe. This problem is spreading in China and other developing countries. The effects of inhaling particulate matter that have been widely studied in humans and animals now include asthma, lung cancer, cardiovascular issues, birth defects, and premature death. The size of the particle is a main determinant of where in the respiratory tract the particle will come to rest when inhaled. The source of formaldehyde and other VOCs in the home is mainly from, for example, furniture, painting, and other different kinds of decorative material, which can use considerable industrial additives in the manufacturing process.

These pollutants can contain high levels of toxic gas or vapor, and can have severe health effects.

To address these pollution problems, several technologies have been developed. A high-efficient particulate absorption (HEPA) filter is a dominant technology which is used to remove particulate material from the air. HEPA filters can be composed of a mat of randomly arranged fibers. The fibers are typically composed of fiberglass and possess diameters between 0.5 and 2.0 micrometers. Significant factors affecting filter function are, for example, fiber diameter, filter thickness, and face velocity. A notable disadvantage of HEPA filter technology is that the filter lifetime is too short and the filter needs to be replaced frequently. HEPA filters are designed to arrest fine particles, but they do not filter out, for example, harmful chemical gas, vapor, or odor molecules. Existing technologies concerned with removing formaldehyde and other VOCs include, for example, absorption, plasma, and photo-catalyst. Most absorption products do not have sufficient capacity. The plasma and photo-catalyst technology can easily generate a secondary pollutant (e.g., ozone). Some cold catalyst technologies are mentioned in China Patent Nos. CN101380574 A1 and CN1208670 A. The cost of this technology is still quite high and it is only able to remove formaldehyde.

In embodiments, the present disclosure provides a method for using a honeycomb structure filter such as GPF (Gasoline Particle Filter) for purifying home or workplace air (i.e., interior space or indoor air). A bare filter can remove PM, and a coated filter can remove, for example, PM and VOCs such as formaldehyde.

In embodiments, the present disclosure provides a method of purifying indoor air.

A "honeycomb structure filter" as disclosed herein, refers to a wall-flow or through-wall honeycomb structure having a portion of channels plugged such as a gasoline particulate filter ("GPF"). The bare or uncoated honeycomb structure filter ("HSF") can remove particulates of all size ranges. The HSF can also be coated in whole or in part with, for example, a sorbent and a catalyst, then the coated HSF can remove both the particulates and a VOC such as formaldehyde.

The present disclosure provides an interior space, such as a home or a workplace, air purification system, which system can use a bare honeycomb structure filter to remove particulate pollutants and a coated honeycomb structure filter that can remove volatiles such as formaldehyde and like VOCs. The air purification system can optionally include, for example, a pre-filter, an aspirator (i.e., a blower), or both.

In embodiments, the article and methods of the present disclosure are advantaged by, for example:

Lifetime: A significant disadvantage of a HEPA filter life is very short, for example, from about 2 or 3 months (e.g., under average conditions and age in China). The filter needs to be replaced because its low PM capacity. The HEPA filter cannot be reused. In contrast to HEPA, the HSF can have greater PM capacity having the same filter size of HEPA filter. Some kinds of HSF, such GPF, can be regenerated at high temperature (e.g., about 650° C.). So the HSF can be regenerated periodically instead of being replaced frequently.

Removal of particulate and non-particulate pollutants with a single filter: Most of the existing filter products use different filters to remove different pollutants. For example, HEPA removes only PM. Some catalyst filters can only remove formaldehyde. An active carbon pack bag can only remove non-particulate pollutants. The disclosed HSF can be coated with a sorbent and a catalyst, then the coated HSF can remove particulate material and non-particulate pollutant at the same time.

Regeneration: The disclosed HSF filter, e.g., a GPF, can be regenerated by, for example, at least one of: heating at of from 400° C. to 500° C. to burn out all adsorbed non-particulate organic chemical pollutants; washing with a suitable detergent to clean up or remove all filtered inorganic residue; rinsing and drying, or combinations thereof. After these regeneration steps, the disclosed and used GPF air filter can be placed back in service and have a service life comparable to a new GPF air filter.

In embodiments, the disclosure provides an air filter article, comprising:

a wall-flow honeycomb particulate filter having at least one coat on at least a portion of the interior surface of the filter, wherein the at least one coat comprises at least one of: a sorbent; a catalyst; or a combination thereof, and the air filter, in-use, retains from the filtered air at least one of: a particulate, a volatile organic compound (VOC), or a combination thereof.

In embodiments, the wall-flow honeycomb particulate filter can comprise an uncoated first-stage particulate filter and a coated second-stage VOC filter in series with the first-stage particulate filter, and the second-stage filter is in fluid communication with the first-stage filter.

In embodiments, the at least one coat includes a combination of the sorbent and the catalyst.

In embodiments, the at least one coat includes a catalyst.

In embodiments, when both the sorbent and the catalyst are present, the sorbent and the catalyst can be present as separate islands or clusters that are dispersed within the pores of the wall-flow honeycomb.

In embodiments, when both the sorbent and the catalyst are present, the sorbent and the catalyst can be an intimate mixture.

In embodiments, the at least one sorbent can be, for example, at least one of: activated carbon, alumina, zeolite, silica gel, and like materials, or combinations thereof.

In embodiments, the catalyst can be, for example, at least one of the following, or a combination thereof:

a metal selected from at least one of: Pt, Ag, Au, Pd, Rh, Cu, Mn, or a combination thereof;

a metal oxide selected from at least one of: $TiO_2$, $MnO_2$, $Mn_3O_4$, $CeO_2$, $V_2O_5$, $Fe_2O_3$, MgO, $ZrO_2$, $Al_2O_3$, $Ag_2O$, PdO, CoO, $SnO_2$, or a combination thereof;

a metal selected from at least one of: Pt, Ag, Au, Pd, Rh, Cu, Mn, or a combination thereof, supported on a metal oxide selected from at least one of: $TiO_2$, $MnO_2$, $Mn_3O_4$, $CeO_2$, $V_2O_5$, $Fe_2O_3$, MgO, $ZrO_2$, $Al_2O_3$, $Ag_2O$, PdO, CoO, $SnO_2$, or a combination thereof.

In embodiments, the at least one catalyst can be, for example, $Pt/TiO_2$.

In embodiments, the air filter article retains a particulate, a volatile organic compound (VOC), or a combination thereof.

In embodiments, the volatile organic compound is formaldehyde.

In embodiments, the wall-flow honeycomb particulate filter can be made of, for example, a ceramic, such as cordierite, and like materials, and can have, for example:

a % porosity of from 50 to 90 vol %;

a cell density of from 100 to 1600 cpsi; and at least one dimension and geometry of:

a diameter of from 4 to 20 inches and a length of from 0.5 to 10 inches, for a filter having a circular end face geometry, i.e., a round shaped cylinder;

a major end face axis of from 4 to 20 inches, a minor end face axis of from 2 to 15 inches and a length of from 0.5 to 10 inches, for a filter having an oval end face geometry, i.e., an oval shaped cylinder; and a length of from 1 to 20 inches, a width of from 1 to 20 inches, and a height of from 0.5 to 20 inches, for a filter having a rectilinear end face geometry, i.e., square or rectangular shaped.

In embodiments, the walls of the wall-flow honeycomb particulate filter can comprise, for example, at least one of a ceramic, a glass, a composite, a polymer, a cellulosic, a natural or synthetic fiber, or a combination thereof.

In embodiments, the filter article can further comprise, for example, two or more of the filter articles configured in parallel, in series, or combinations thereof.

In embodiments, the disclosure provides a method of making the above mentioned filter article, comprising at least one of:

dipping a portion of the wall-flow ceramic honeycomb particulate filter into a liquid containing the at least one sorbent and the at least one catalyst;

including the at least one sorbent and the at least one catalyst in a ceramic batch mixture and then extruding the mixture through honeycomb forming die;

exposing the wall-flow ceramic honeycomb to a vapor containing the at least one sorbent; exposing the wall-flow ceramic honeycomb to an aerosol containing the at least one sorbent and the at least one catalyst;

or a combination thereof.

In embodiments, if both the sorbent and the catalyst are present, then the sorbent and the catalyst can be formulated, for example, as an intimate mixture, or as separate islands or clusters that are, for example, dispersed within the pores of the wall-flow honeycomb, on the walls of the filter, or a combination thereof.

In embodiments, the dipping coats substantially the entire interior surface of the ceramic honeycomb with the at least one sorbent and the at least one catalyst, for example, by capillary action.

In embodiments, the disclosure provides an interior air purification system, comprising:

at least one of the abovementioned air filter articles; and at least one air handler having a holder for the at least one air filter article, wherein the air handler directs ambient indoor source air through the at least one air filter article and expels filtered air having from 80 to 90% reduction, including intermediate values and ranges, in the particulate content compared to the ambient indoor source air, and having from 80 to 90% reduction, including intermediate values and ranges, in the volatile organic compound (VOC) content compared to the ambient indoor source air.

In embodiments, the at least one air handler has an air throughput capacity of, for example, from 50 $m^3$/hr to 1000 $m^3$/hr, including intermediate values and ranges.

In embodiments, the air purification system can further comprise, for example, two or more of the articles configured in parallel, in series, or combinations thereof.

In embodiments, the disclosure provides a method and apparatus for interior air purification applications and situations. In embodiments, the method uses a honeycomb structure filter (i.e., a wall flow filter) such as a gasoline particulate filter (GPF).

The honeycomb structure filter (HSF) can be made of a high porosity material, such as cordierite prepared with an organic pore former. Although not limited by theory, the filtration mechanism is believed to include Brownian diffusion, interception, and inertial. For smaller particulates below about 300 nm in diameter, the Brownian diffusion is the dominant filtration mechanism. The fine particles diffuse from the gas to the surface of the collecting body and are collected there due to Brownian movement. For larger sized particles, interception, and inertial can be the dominant mechanism. Interception occurs when the fluid streamline passes within one particle radius of the collecting body. In such an instance the particle traveling along that stream line comes in contact with the body and may be collected there. Particles with a density greater than that of the fluid in which it is suspended will experience an inertial force, which can cause the particles to cross streamlines as they diverge from the particle medium. The particles will then hit the body and are collected. Based on the above, the HSF can remove all size range particles.

Referring to the Figures, FIG. 1 shows in a cut-away perspective of a honeycomb structure filter (HSF) [PRIOR ART] (100) illustrating air flow (130 in; 135 out) and the principle of operation in particulate filtration. The air flow goes through the high porosity walls (110) and the particles are trapped on the walls of the blocked (120) or dead-end channels (125).

Figure 2:
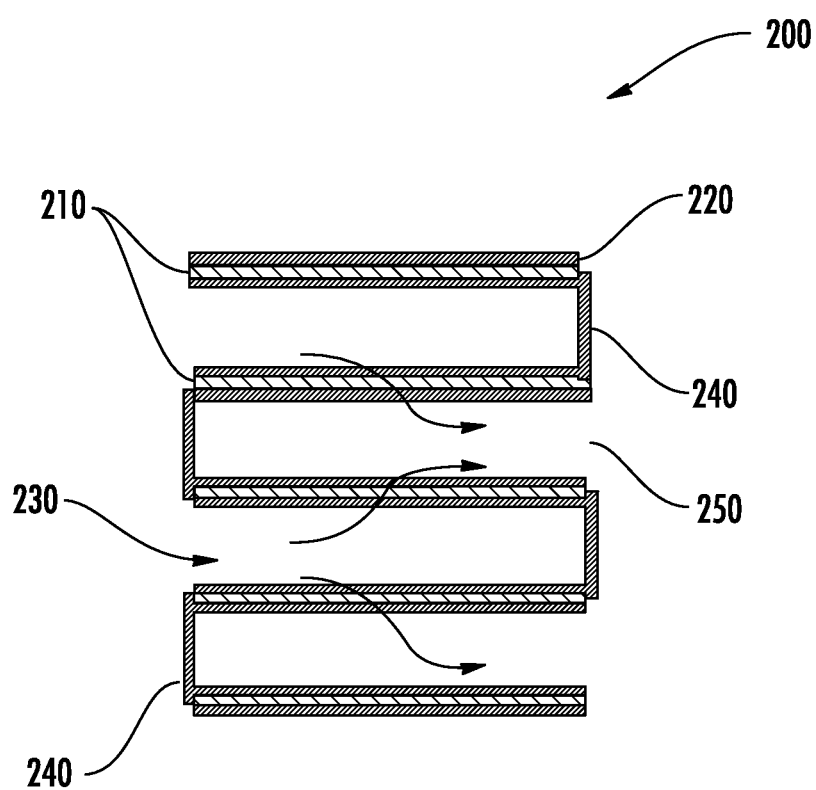
FIG. 2 shows in cross-section a fluid flow diagram and the principle of operation in a coated HSF application in interior air purification.

FIG. 2 shows in cross-section a diagram of air flow and the principle of operation in a coated HSF application in interior air purification. The sorbent and catalyst can be coated (220) on the wall (210) of the honeycomb structured filter (200), and the sorbent and catalyst can absorb or have a chemical reaction with the chemical gas pollutant when the gas or vapor flows through the coating and the wall. Air flowing into the filter (230) penetrates the walls (210) and optionally the end seals (240) and exits the filter as air flow out (250) leaving pollutants trapped in the filter.

Figure 3:
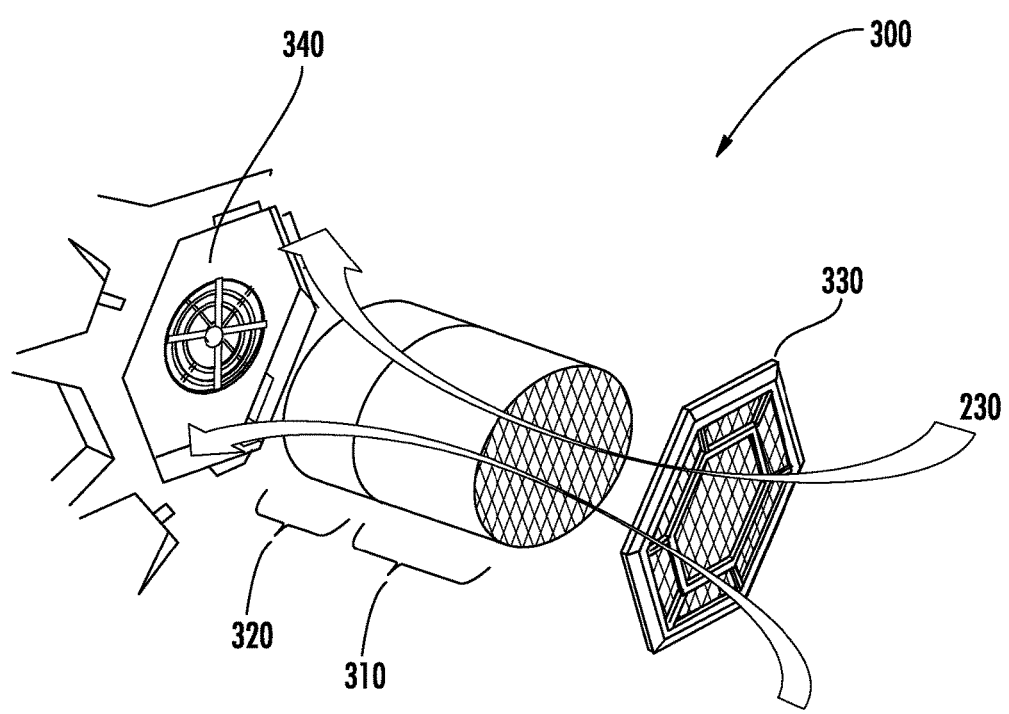
FIG. 3 shows a schematic of an interior air purifier system (300) including a two-stage HSF structure, a pre-filter (320), and an aspirator or blower (330).

FIG. 3 shows a schematic of an interior air purifier system (300) including a HSF structure (310 and 320 in series). The system includes, for example, a bare HSF first-stage (310), a formaldehyde and volatile organic compound (VOC) second-stage (320) filter, an optional pre-filter (330), and an aspirator or blower (340). The first and second stages can be integral in a single filter member, or can be separated in two filter members that are placed end-to-end or in series to process the air (230) flowing into the purifier system.

Figure 4:
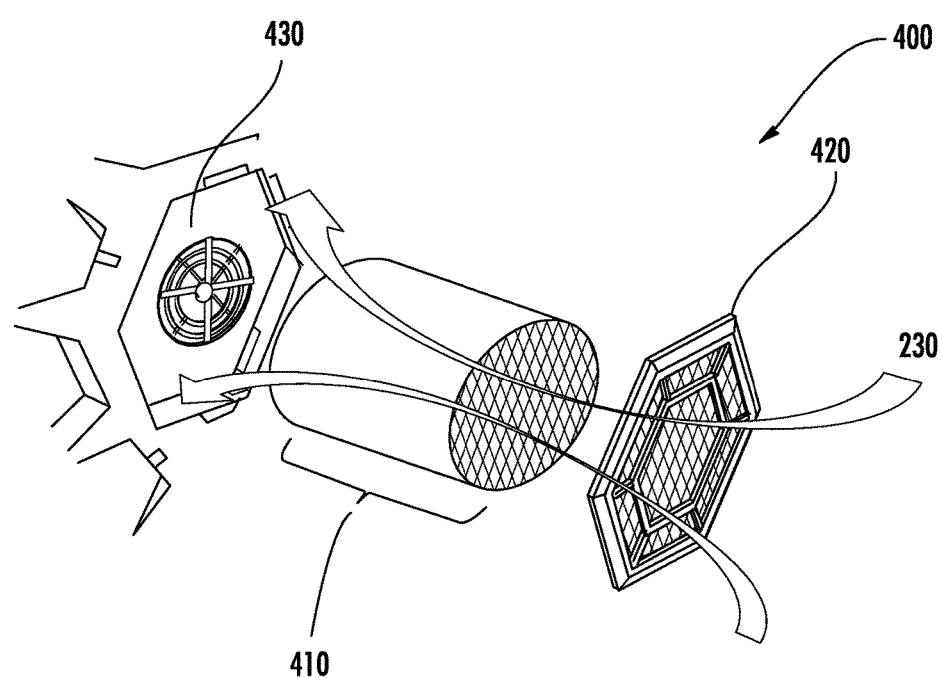
FIG. 4 shows a schematic of an interior air purifier system (400) including, for example, a single-stage coated HSF structure (410), a pre-filter (420), and an aspirator or blower (430).

FIG. 4 shows a schematic of an interior air purifier system (400) including, for example, a coated HSF structure (410), a pre-filter (420), and an aspirator or blower (430). The aspirator or blower (430) can draw, push, or both draw and push, ambient interior air (230) into the purifier system.

Figure 5:
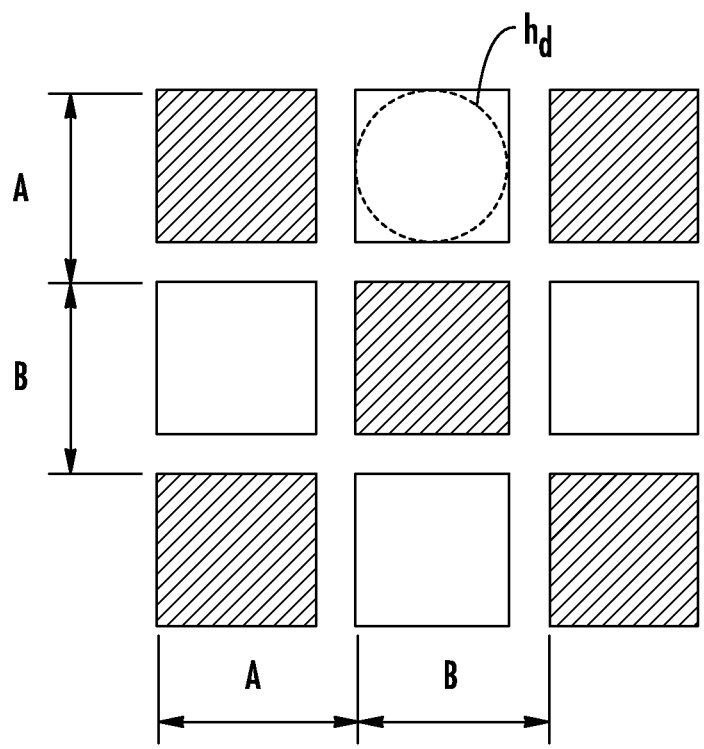
FIG. 5 shows a schematic of an example cellular filter described in Example 1.

FIG. 5 shows a schematic of a portion of an example cellular filter described in Example 1 having square cells where "A" designates sealed, plugged, or blocked cells, "B" designates open cells, and $h_d$ designates the square cell shape that becomes more circular with continued accumulation of trapped particulate material during use.

The combination of a honeycomb structure and the high porosity of the material provide a filter having a high surface area, a low pressure drop, and a high capacity for particulate and VOCs.

For removing PM, the capacity of the HSF is also higher than HEPA having the same size. Certain HSF materials, such as a GPF, can endure high temperatures and can be conveniently regenerated. Subjecting the filter to high temperature can effectively burn out and remove accumulated particles. This burn out regeneration can significantly extend the filter lifetime.

Coating the sorbent and the catalyst on the channel walls of HSF produces a filter that can remove PM, and chemical gas pollutants (e.g., VOC such as formaldehyde) in a single filter. A sorbent such as activated carbon, alumina, zeolite, or combinations thereof can be used to absorb chemical gas pollutants. The catalyst can also assist removing chemical gas pollutants. For example, $Pt/TiO_2$ can have a chemical reaction with the formaldehyde at room temperature. The high surface area of HSF causes the air flow to have high contact with the coating and the catalyst.

To apply the HSF, the air purifier system can consists of several components including, for example, a HSF, a formaldehyde or VOC filter (which is unnecessary when using a coated HSF), a pre-filter, and an aspirator or a blower. The application of a bare HSF is shown in FIG. 3. A pre-filter can optionally be situated before or in front of the HSF to remove large particles, such as hair or fibers of comparable size. Following the HSF, a formaldehyde or VOC filter can be installed. In this instance, a HSF specified to remove the PM, can be combined with another filter to remove other pollutants. The air flow can be generated by a single aspirator, which means the aspirator will suck air through the filtration system. A coated HSF is shown in FIG. 4.

The difference between FIG. 3 and FIG. 4 is that the formaldehyde or VOC filter is not necessary in the system of FIG. 4 because the coated HSF combines both PM and VOC pollution removal functions.

In embodiments, the metal oxide can be used as the substrate for the metal or the metal oxide can be used alone. The mixture of more than two kinds of metal oxide may form a solid solution. The catalyst loading on the GPF can be, for example, of from 5 to 200 g/L of batch material or wash coat, depending on the target air quality and operating conditions.

In embodiments, the loading of the catalyst on the GPF can be accomplished by any suitable method, for example:

loading the natural or synthesized catalyst solid powder directly by gas blowing or vacuum infiltration;

uniformly coating a catalyst solution into the pores of the GPF by, for example, dip coating, wash coating, water fall, or like processes, followed by drying or sintering;

applying catalyst precursors to the GPF and then synthesizing the catalyst in-situ; or combinations thereof.

In embodiments, the catalyst loading process may contain multiple steps that combine one or more suitable approaches.

EXAMPLES

The following Example(s) demonstrate making, use, and analysis of the disclosed honeycomb air filter article in accordance with the above description and general procedures.

Example 1

Honeycomb Air Filter Article

A gasoline particulate filter (GPF) is one example of a through-wall honeycomb filter structure. Some parameters of a representative honeycomb structure filter "300/8", that is having a cell density of 300 cpsi and wall thickness of 8 mils, are listed in Table 1.

TABLE 1

| Parameter | honeycomb structure filter "300/8" |
|---|---|
| Cell Density | 300 cpsi |
| Wall Thickness | 0.203 mm (0.008 inches, 8 mils, or 8 thousandths of an inch) |

TABLE 1-continued

| Parameter | honeycomb structure filter "300/8" |
|---|---|
| Material composition | cordierite |
| Bulk density | 0.0078 $lbs/in^3$ |
| Porosity | 65.9 vol % |
| Plug length | 7 mm |
| Cell design | standard square cells |
| Cell Size | A = 1.47 mm (0.058")<br>B = 1.47 mm (0.058")<br>where white squares represent an open channel, and black squares represent a plugged channel, see FIG. 5. |

Example 2 (Prophetic)

Catalyst Coating Method 10 g of $TiO_2$ powder is dispersed in 100 mL of an aqueous solution containing $PtCl_2$. The $PtCl_2$ concentration can vary depending on the desired Pt loading. Typically, the Pt loading on $TiO_2$ powder is 3 wt % or less. The resulting combined dispersion and solution is concentrated to dryness, and the powder is calcined in air at 500° C. for from 1 to 3 hours. The calcined $Pt/TiO_2$ powder is dispersed in water. A GPF sample is dipped into the powder dispersed in water so that the dispersion fills all the pores in the wall. The dipped sample is removed, drained, and the dried to remove excess and residual dispersion and liquid. The surface area of the $TiO_2$ powder is greater than 40 $m^2/g$. The catalyst is uniformly dispersed in the pores of the filter walls.

Example 3

Air Purification System

An exemplary air purifier unit that includes the disclosed filter is summarized in Table 2.

TABLE 2

| Parameters and performance for an air purifier system. | |
|---|---|
| Power requirement | 220 to 240 V, 50/60 Hz |
| Energy consumption | 120 Watt |
| Dimensions | H70 × W40 × D40 cm |
| Air delivery rate (filter installed) | 550 $m^3/hr$ |
| Fan motor | Centrifugal |
| Air intake | Dual arches at bottom of unit |
| Air outlet | Diffuser on the top |
| Filter configuration | |
| HSF | Four 5.66" (D) × 4.5" (L) honeycomb structure filters (HSFs) in parallel. Filter cell density: 200; Filter wall thickness: 8 mil |
| Performance | |
| Clean Air Delivery Rate for particles[1] | greater than 400 $m^3/hr$ |
| Clean Air Delivery Rate for particles[1] | greater than 100 $m^3/hr$ |
| Service life: periodic filter replacement or regeneration | greater than 24 months |

[1]Tested according to the China national standard GBT18801.

The disclosure has been described with reference to various specific embodiments and techniques. However, it should be understood that many variations and modifications are possible while remaining within the scope of the disclosure.

What is claimed is:

1. An air filter, comprising:
   at least one wall-flow honeycomb particulate filter having at least one coat on at least a portion of an interior surface of the at least one wall-flow honeycomb particulate filter, the at least one coat comprising a sorbent and a Pt/TiO$_2$ catalyst, wherein the sorbent forms islands or clusters dispersed within pores of the at least one wall-flow honeycomb particulate filter and the Pt/TiO$_2$ catalyst forms separate islands or clusters that are dispersed within the pores of the at least one wall-flow honeycomb particulate filter; and
   the air filter, in-use, retains from filtered air a particulate and a volatile organic compound, wherein the volatile organic compound is formaldehyde.

2. The air filter of claim 1 wherein the at least one wall-flow honeycomb particulate filter comprises a first uncoated particulate filter portion, and a second coated filter portion in series and in fluid communication with the first particulate filter portion.

3. The air filter of claim 1 wherein the sorbent comprises at least one of: activated carbon, alumina, zeolite, silica gel, or combinations thereof.

4. The air filter of claim 1 wherein the wall-flow honeycomb particulate filter comprises a ceramic, the filter having:
   a % porosity of from 50 to 90 vol %;
   a cell density of from 100 to 1600 cpsi; and
   at least one dimension and geometry of:
      a diameter of from 4 to 20 inches and a length of from 0.5 to 10 inches, for a filter having a circular end face geometry;
      a major end face axis of from 4 to 20 inches, a minor end face axis of from 2 to 15 inches, and a length of from 0.5 to 10 inches, for a filter having an oval end face geometry;
      a length of from 1 to 20 inches, a width of from 1 to 20 inches, and a height of from 0.5 to 20 inches, for a filter having a rectilinear end face geometry; or combinations thereof.

5. The air filter of claim 1 wherein the walls of the wall-flow honeycomb particulate filter comprise at least one of a ceramic, a glass, a composite, a polymer, a cellulosic, a natural or synthetic fiber, or a combination thereof.

6. The air filter of claim 1, further comprising two or more of the filters configured in parallel, in series, or combinations thereof.

7. A method of making the air filter of claim 1, comprising at least one of:
   dipping a portion of at least one wall-flow honeycomb particulate filter into a liquid containing at least one sorbent, at least one catalyst, or a combination thereof;
   extruding a ceramic batch mixture comprising at least one sorbent, at least one catalyst, or a combination thereof, through a honeycomb forming die;
   exposing at least one wall-flow honeycomb particulate filter to a vapor containing at least one sorbent;
   exposing at least one wall-flow honeycomb particulate filter to an aerosol containing the at least one sorbent, at least one catalyst, or a combination thereof;
   or a combination thereof.

8. The method of claim 7 wherein the dipping coats substantially the entire interior surface of the wall-flow honeycomb particulate filter with the at least one sorbent, at least one catalyst, or a combination thereof.

9. An interior air purification system, comprising:
   at least one air handler having a holder for at least one air filter of claim 1, wherein the air handler directs ambient indoor source air through the at least one air filter and expels filtered air having from 80 to 90% reduction in the particulate content, and from 80 to 90% reduction in the volatile organic compound content, compared to the ambient interior source air.

10. The air purification system of claim 9 wherein the at least one air handler has an air throughput capacity of from 50 m$^3$/hr to 1000 m$^3$/hr.

11. The air purification system of claim 9 further comprising a housing including two or more of the air filters configured in parallel, in series, or combinations thereof.

* * * * *

UNITED STATES PATENT AND TRADEMARK OFFICE
CERTIFICATE OF CORRECTION

PATENT NO. : 10,188,975 B2
APPLICATION NO. : 14/876104
DATED : January 29, 2019
INVENTOR(S) : Xiaodong Robert Fu et al.

Page 1 of 1

It is certified that error appears in the above-identified patent and that said Letters Patent is hereby corrected as shown below:

In the Claims

In Column 10, Lines 19-20 approx., Claim 7, delete "thereof; or a combination thereof."
and insert -- thereof. --, therefor.

Signed and Sealed this
Seventeenth Day of December, 2019

Andrei Iancu
*Director of the United States Patent and Trademark Office*